(12) United States Patent
Koyama et al.

(10) Patent No.: US 9,765,198 B2
(45) Date of Patent: Sep. 19, 2017

(54) POLYESTER RESIN COMPOSITION AND FORMED ARTICLE INCLUDING RESIN COMPOSITION

(71) Applicant: KANEKA CORPORATION, Osaka-shi (JP)

(72) Inventors: Ryohei Koyama, Settsu (JP); Tetsuya Minami, Settsu (JP); Noriyuki Suzuki, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 14/892,149

(22) PCT Filed: Mar. 26, 2014

(86) PCT No.: PCT/JP2014/001751
§ 371 (c)(1),
(2) Date: Nov. 18, 2015

(87) PCT Pub. No.: WO2014/188646
PCT Pub. Date: Nov. 27, 2014

(65) Prior Publication Data
US 2016/0090466 A1    Mar. 31, 2016

(30) Foreign Application Priority Data

May 20, 2013 (JP) ................................. 2013-106354

(51) Int. Cl.
*C08K 5/053* (2006.01)
*C08K 5/103* (2006.01)
*C08L 101/16* (2006.01)

(52) U.S. Cl.
CPC .............. *C08K 5/053* (2013.01); *C08K 5/103* (2013.01); *C08L 101/16* (2013.01)

(58) Field of Classification Search
CPC ........ C08K 5/053; C08K 5/103; C08L 101/16
See application file for complete search history.

(56) References Cited

U.S. PATENT DOCUMENTS

| 6,127,512 A | * | 10/2000 | Asrar | C08K 3/22 528/271 |
| 2010/0160505 A1 | * | 6/2010 | Kumazawa | C08L 67/04 524/112 |
| 2012/0065342 A1 | * | 3/2012 | Hamaguchi | C08G 63/88 525/437 |

FOREIGN PATENT DOCUMENTS

| JP | 2007231184 | * | 9/2007 |
| JP | 2012-177011 A | | 9/2012 |
| WO | 2008/099586 A1 | | 8/2008 |

OTHER PUBLICATIONS

Fernandes, E.G., et al.; Macromol. Symp., 2004, vol. 218, p. 157-164.*
International Search Report issued May 13, 2014, for PCT/JP14/001751 filed Mar. 26, 2014.
English translation of International Preliminary Report on Patentability and Written Opinion issued Nov. 24, 2015 in PCT/JP2014/001751.

* cited by examiner

*Primary Examiner* — Robert Jones, Jr.
(74) *Attorney, Agent, or Firm* — Oblon, McClelland, Maier & Neustadt, L.L.P.

(57) ABSTRACT

Provided is a resin composition excellent in processability and productivity, which improves low crystallization rate and improves processability in forming such as injection molding or sheet forming. Provided is a polyester resin composition including a polyester resin (A), a crystallization promoter (B), and pentaerythritol (C).

20 Claims, No Drawings

POLYESTER RESIN COMPOSITION AND FORMED ARTICLE INCLUDING RESIN COMPOSITION

TECHNICAL FIELD

The present invention relates to a polyester resin composition, and in particular to a polyester resin composition for the purpose that a biodegradable polyester resin, which is degraded by action of microorganisms, is used for various industrial materials, and a formed article made of this composition.

BACKGROUND ART

In recent years, the development of biodegradable plastics has been becoming active as materials for solving problems that plastic wastes cause a large burden to be imposed onto the global environment, examples of the problem including an effect onto ecological systems, the generation of harmful gases when the wastes are burned, and global warming based on a large quantity of burning calories thereof.

Carbon dioxide emitted when plant-originating biodegradable plastics out of the biodegradable plastics are burned is originally present in the air. Thus, the plant-originating biodegradable plastics do not cause an increase in carbon dioxide quantity in the atmosphere. This matter is called carbon neutrality. Importance is attached to the matter under the Kyoto Protocol, in which target values are set for carbon dioxide reduction. Thus, an active use of the plant-originating biodegradable plastics has been desired.

Recently, from the viewpoint of biodegradability and carbon neutrality, attention has been paid to polyester resins of plastics originating from plants, in particular, to polyhydroxyalkanoate (hereinafter may be referred to as PHA) resins. Furthermore, out of the PHA resins, attention is paid to the followings: poly(3-hydroxybutyrate) homopolymer resin, poly(3-hydroxybutyrate-co-3-hydroxyvalerate) copolymer resin, poly(3-hydroxybutyrate-co-3-hydroxyhexanoate) copolymer resin, poly(3-hydroxybutyrate-co-4-hydroxybutyrate) copolymer resin, polylactic acid, and others.

However, it is known that the polyester resins are small in crystallization speed. Thus, when subjected to forming, the resins need to be cooled for a long cooling period for solidification after heated and melted, so that the resins have problems of being poor in processability and productivity.

Accordingly, in order to improve the crystallization of PHA type resins, the following has been hitherto suggested (for example, Patent Literature 1): the blend of an additive as a crystallization nucleating agent, examples of the additive including boron nitride, titanium oxide, talc, sugar alcohol, polyvinyl alcohol, chitin, and chitosan. However, under the actual circumstances, there has not yet been substantially found out, as the crystallization nucleating agent for PHA resins, any agent having a great advantageous effect. Thus, a further improvement has been desired.

CITATION LIST

Patent Literature

PTL 1: WO 2008/099586

SUMMARY OF INVENTION

Technical Problem

An object of the present invention is to improve the low crystallization rate of biodegradable polyesters, which are degraded into water or carbon dioxide by action of microorganism, to improve the processability thereof in forming, such as injection molding or sheet forming, thereby providing a resin composition showing excellent productivity when the composition is formed or made into pellets.

Solution to Problem

The inventors have found out that by blending a crystallization promoter and pentaerythritol with a polyester resin, which is slowly crystallized, the crystallization of the polyester resin can be promoted and the processability and the productivity of the polyester are improved. Thus, the present invention has been achieved.

Accordingly, the present invention relates to a polyester resin composition comprising a polyester resin (A), a crystallization promoter (B), and pentaerythritol (C).

The crystallization promoter (B) is preferably a modified glycerin-based compound.

The modified glycerin-based compound preferably comprises at least one selected from the group consisting of glycerin diacetomonolaurate, glycerin diacetomonooleate, glycerin monoacetostearate, glycerin diacetomonocaprylate, and glycerin diacetomonodecanoate.

The composition preferably comprises 1 to 30 parts by weight of the crystallization promoter (B) for 100 parts by weight of the polyester resin (A).

The composition preferably comprises 0.05 to 12 parts by weight of the pentaerythritol (C) for 100 parts by weight of the polyester resin (A).

The polyester resin (A) preferably comprises at least one selected from the group consisting of polyhydroxyalkanoates, polyethylenesuccinate, polybutylenesuccinate, and polybutylenesuccinate/adipate.

The polyhydroxyalkanoates preferably comprise at least one selected from the group consisting of poly(3-hydroxybutyrate), poly(3-hydroxybutyrate-co-3-hydroxyvalerate), poly(3-hydroxybutyrate-co 3-hydroxyvalerate-co-3-hydroxyhexanoate), poly(3-hydroxybutyrate-co-3-hydroxyhexanoate), poly(3-hydroxybutyrate-co-4-hydroxybutyrate), and polylactic acid.

The present invention also relates to a polyester resin formed article obtained by forming the polyester resin composition.

Advantageous Effects of Invention

In accordance with the resin composition of the present invention, the low crystallization rate of a biodegradable polyester is improved. Thus, the polyester is improved in processability when subjected to forming, such as injection molding or sheet forming, so that the polyester can show excellent productivity when formed or made into pellets.

DESCRIPTION OF EMBODIMENTS

Hereinafter, the present invention will be described in more detail.

The polyester resin composition of the present invention is characterized by including a polyester resin (A), a crystallization promoter (B), and pentaerythritol (C).

The polyester resin (A) used in the present invention has a weight-average molecular weight (hereinafter may be referred to as Mw) of 10000 or more. Examples thereof include aromatic polyesters such as poly(tetramethylenesuccinate-co-terephthalate), poly(ethylenesuccinate-co-terephthalate) and poly(tetramethyleneadipate-co-terephthalate); and aliphatic polyesters such as polyhydroxyalkanoates, polyethylenesuccinate, polybutylenesuccinate, polybutylenesuccinate/adipate, polyethylenesebacate, polybutylenesebacate, and polyhexamethylenesebacate.

From the viewpoint of the processability, and physical properties of the resultant formed article, it is preferred that the polyester resin (A) includes at least one selected from the group consisting of polyhydroxyalkanoates, polyethylenesuccinate, polybutylenesuccinate, and polybutylenesuccinate/adipate. Particularly preferred are PHAs since these polyesters are bio-based materials giving a small environment load, and are eugenically degradable. The PHAs preferably include at least one selected the group consisting of from poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), poly(3-hydroxybutyrate-co-4-hydroxybutyrate), and polylactic acid.

The PHA used in the present invention is an aliphatic polyester containing a recurring unit represented by the formula (1): [—CHR—$CH_2$—CO—O—] wherein R is an alkyl group represented by $C_nH_{2n-1}$ wherein n is an integer of 1 or more and 15 or less.

The PHA is preferably a polymer resin containing 80 mol % or more of 3-hydroxybutyrate, more preferably a polymer resin containing 85 mol % or more of 3-hydroxybutyrate. Such a polymer resin is preferably a resin produced by microorganisms. Specific examples thereof include poly(3-hydroxybutyrate) homopolymer resin, poly(3-hydroxybutyrate-co-3-hydroxypropionate) copolymer resin, poly(3-hydroxybutyrate-co-3-hydroxyvalerate) copolymer resin, poly(3-hydroxybutyrate-co-3-hydroxyvalerate-co-3-hydroxyhexanoate) copolymer resin, poly(3-hydroxybutyrate-co-3-hydroxyhexanoate) copolymer resin, poly(3-hydroxybutyrate-co-3-hydroxyheptanoate) copolymer resin, poly(3-hydroxybutyrate-co-3-hydroxyoctanoate) copolymer resin, poly(3-hydroxybutyrate-co-3-hydroxynonanoate) copolymer resin, poly(3-hydroxybutyrate-co-3-hydroxydecanoate) copolymer resin, poly(3-hydroxybutyrate-co-3-hydroxyundecanoate) copolymer resin, and poly(3-hydroxybutyrate-co-4-hydroxybutyrate) copolymer resin.

In particular, from the viewpoint of the processability, and physical properties of the formed article, the following are preferably usable: poly(3-hydroxybutyrate) homopolymer resin, poly(3-hydroxybutyrate-co-3-hydroxyvalerate) copolymer resin, poly(3-hydroxybutyrate-co-3-hydroxyvalerate-co-3-hydroxyhexanoate) copolymer resin, poly(3-hydroxybutyrate-co-3-hydroxyhexanoate) copolymer resin, poly(3-hydroxybutyrate-co-4-hydroxybutyrate) copolymer resin.

In the constituent ratio of 3-hydroxybutyrate (hereinafter may be referred to as 3HB) to comonomer(s) copolymerized therewith (for example, 3-hydroxyvalerate (hereinafter may be referred to as 3HV, 3-hydroxyhexanoate (hereinafter may be referred to as 3HH), 4-hydroxybutyrate), that is, the ratio between the monomers in the copolymer resin in the PHA, the ratio of 3-hydroxybutyrate to the comonomer(s) is preferably from 97/3 to 80/20 (mol %/mol %), more preferably from 95/5 to 85/15 (mol %/mol %) from the viewpoint of the processability, the quality of the formed article, and others. If the proportion of the comonomer(s) is less than 3% by mole, the polyester resin composition may not be easily formed since the processing temperature and the thermal decomposition temperature are close to each other. If the proportion of the comonomer(s) is more than 20 mol %, the PHA is slowly crystallized so that the PHA may be deteriorated in productivity. The comonomer(s) may be a comonomer, or two or more comonomers. Even when two or more comonomers are used as the comonomer(s), a preferred range of the ratio between the monomers (the ratio of 3-hydroxybutyrate/the comonomers) in the copolymer resin is the same as described above.

The ratio between the individual monomers in the copolymer resin of the PHA is measurable through gas chromatography as follows: To about 20 mg of dry PHA are added 2 mL of a mixed liquid of sulfuric acid and methanol (15/85 (ratio by weight)) and 2 mL of chloroform. The system is airtightly stopped, heated at 100° C. for 140 minutes to yield methyl esters of a decomposition product of the PHA. After cooling, 1.5 g of sodium hydrogencarbonate is added thereto little by little to neutralize the mixture, and left to stand still until the generation of carbon dioxide stops. Thereto is added 4 mL of diisopropyl ether, and then the components are sufficiently mixed with each other. Thereafter, in the supernatant, the monomer unit composition of the PHA decomposition product is analyzed through capillary gas chromatography. In this way, the ratio between the individual monomers in the copolymer resin can be obtained.

A gas chromatograph used for the above is "GC-17A" manufactured by Shimadzu Corporation. A capillary column used therefor is "NEUTRA BOND-1" manufactured by GL Sciences Inc. (column length: 25 m, column internal diameter: 0.25 mm, and liquid film thickness: 0.4 µm). As a carrier gas, He is used. The pressure in an inlet of the column is set to 100 kPa, and the amount of an injected sample is 1 µL. Regarding temperature conditions, the sample temperature is raised from an initially starting temperature of 100° C. to 200° C. at a rate of 8° C./minute, and further raised from 200 to 290° C. at a rate of 30° C./minute.

The weight average molecular weight of the polyester resin (A) in the present invention is not particularly limited as far as the molecular weight is 10000 or more. The molecular weight is preferably from 100000 to 2500000, more preferably from 250000 to 2000000, even more preferably from 300000 to 1000000 since the resin composition is excellent in processability and mechanical properties. If the weight average molecular weight is less than 100000, the mechanical properties and others may be poor. If the weight average molecular weight is more than 2500000, the resin composition may not be easily formed.

For a method for measuring the above-mentioned weight average molecular weight, a gel permeation chromatography ("Shodex GPC-101" manufactured by Showa Denko K.K.) is used. In its column, a polystyrene gel ("Shodex K-804" manufactured by Showa Denko K.K.) is used. Chloroform is used for its mobile phase. The molecular weight can be obtained as a molecular weight in terms of polystyrene. A calibration curve at this time is prepared, using polystyrene species having weight average molecular weights of 31400, 197000, 668000 and 1920000, respectively.

The PHA is produced by *Alcaligenes eutrophus* AC32 strains into which a PHA synthase gene originating from *Aeromonas caviae* is introduced (International Depositary based on Budapest Treaty (international depositary authority: the Patent Microorganisms Depositary of the National Institute of Advanced Industrial Science and Technology (Central 6, 1-1-1 Higashi, Tsukuba City, Ibaraki Prefecture, Japan), Original Depositing date: Aug. 12, 1996, Transferred on Aug. 7, 1997, Deposition No.: FERM BP-6038 (transferred from original deposition: FERM P-15786)) (J. Bacteriol., 179, 4821(1997)), or some other microorganism.

The crystallization promoter (B) in the present invention is a component other than pentaerythritol out of components for promoting the crystallization of the polyester resin (A) having a weight average molecular weight of less than 10000.

The crystallization promoter (B) in the present invention is not particularly limited as far as the crystallization promoter (B) is a compound that is blended into the composition to make an action of promoting the crystal nucleating agent effect of the pentaerythritol (C), and is a compound capable of speeding up the production of crystals of the polyester resin containing pentaerythritol or speeding up the growth of the crystals. The crystallization promoter (B) may be, for example, a material capable of increasing the area of a peak of heat-generation following the crystallization when the polyester resin is cooled at a constant temperature-lowering rate from a melt state thereof in a differential scanning calorimetry (DSC), a material for shifting the peak of the heat-generation toward higher temperatures, or a material having an effect of heightening the production speed of crystal nuclei or the growth speed of spherulites when the polyester resin is cooled at any temperature-lowering rate from a melt state thereof.

The blend of the crystallization promoter (B) makes it possible to improve the polyester resin largely in processability, for example, to increase the polyester resin in line speed when the resin is melt-kneaded and then extruded into a strand form, to increase the resin in line speed when the resin is shaped into a sheet/film form, or to shorten, when the resin is injection-molded, the releasing period of formed article.

The blend amount of the crystallization promoter (B) in the present invention is from 1 to 30 parts by weight, preferably from 4 to 20 parts by weight for 100 parts by weight of the polyester resin (A). If the content is less than 1 part by weight, the crystallization promoting effect may be small. If the content is more than 30 parts by weight, the effect is not increased further and, in addition, bleeding-out may be caused.

The crystallization promoter (B) is preferably a compound having an ester bond. Specific examples of the crystallization promoter (B) include modified glycerin-based compounds, adipate-based compounds, polyetherester-based compounds, benzoate-based compounds, phthalate-based compounds, isosorbide ester compounds, and polycaprolactone-based compounds.

As the crystallization promoter (B), modified glycerin-based compounds are preferred since the compounds are excellent in costs and general usability, and are further high in biomass degree. The modified glycerin-based compounds are compounds in each of which hydroxyl groups of glycerin partially or wholly form ester bonds with a compound having carboxyl groups.

The modified glycerin-based compounds are preferably glycerin ester compounds. The glycerin ester compounds may each be any of monoesters, diesters and triesters of glycerin. From the viewpoint of the crystallization promoting effect, triesters of glycerin are preferred. Of the triesters of glycerin, glycerin diacetomonoesters are particularly preferred. Specific examples of the glycerin diacetomonoesters include glycerin diacetomonolaurate, glycerin diacetomonooleate, glycerin diacetomonostearate, glycerin diacetomonocaprylate, and glycerin diacetomonodecanoate.

As the crystallization promoter (B), the following compounds are preferably used since the compounds are excellent in compatibility with the resin component and hardly cause bleed: glycerin diacetomonoester-based compounds, adipate-based compounds, polyetherester-based compounds, benzoate-based compounds, and others. The adipate-based compounds are preferably diethylhexyl adipate, dioctyl adipate, and diisononyl adipate. The polyetherester-based compounds are preferably polyethylene glycol dibenzoate, polyethylene glycol dicaprylate, and polyethylene glycol diisostearate.

A substance containing a biomass-originating component in a large proportion is also preferably usable since the whole of the composition can be heightened in biomass degree, examples of the substance including epoxidized soybean oil, epoxidized aliphatic acid 2-ethylhexyl, and monoesters of sebacic acid.

Examples of the modified glycerin-based compounds include "RIKEMAL (registered trademark)" PL series manufactured by Riken Vitamin Co., Ltd.

The crystallization promoter (B) may be not only one species thereof, but also a blend of two or more species thereof. The blend ratio therebetween may be appropriately adjusted in accordance with the species of the polyester resin (A), and the target crystal nucleating agent effect of the pentaerythritol (C).

When a PHA is used as the polyester resin (A), the crystallization promoter (B) is preferably a diester of glycerin, more preferably a diacetomonoester of glycerin, even more preferably glycerin diacetomonolaurate.

The pentaerythritol (C) is blended as a crystal nucleating agent for the polyester resin (A) into the aliphatic polyester resin composition of the present invention. In the present invention, pentaerythritol can heighten the crystallization speed of the polyester resin, and additionally the crystallization promoter (B) can further promote the crystallization of the polyester resin, so that the resin composition can be improved in processability and productivity.

Pentaerythritol is a compound represented by the following formula (2):

[Chemical Formula 1]

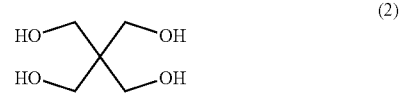

(2)

This compound is a kind of polyhydric alcohol, and is an organic compound having a melting point of 260.5° C. and a white crystal form. Although pentaerythritol is classified into a sugar alcohol, pentaerythritol does not originate from any natural product. Pentaerythritol can be synthesized by condensing acetaldehyde and formaldehyde with each other in a basic environment.

A product of pentaerythritol to be used in the present invention is not particularly limited as far as the product is ordinarily available. The product may be a reagent product or an industrial product. Examples of the reagent product include products manufactured by Wako Pure Chemical Industries, Ltd., Sigma-Aldrich Corporation, Tokyo Chemical Industry Co., Ltd., and Merck, respectively. Examples of the industrial product include products manufactured by Koei Chemical Co., Ltd. (trade name: PENTARIT) and Toyo Chemicals Co., Ltd., respectively. However, the reagent or industrial product is not limited to these examples.

Ordinarily available reagent products or industrial product may contain, as impurities, oligomers produced by dehydration-condensing pentaerythritol, such as dipentaerythritol and tripentaerythritol. These oligomers do not have any effect for the crystallization of the aliphatic polyester resin. However, the oligomers do not hinder the crystallization effect based on pentaerythritol. Accordingly, the pentaerythritol used in the present invention may contain the oligomers.

The amount of the pentaerythritol used in the present invention is not particularly limited as far as the amount makes it possible to accelerate the crystallization of the polyester resin (A). However, in order that the pentaerythritol can gain an effect of functioning as a crystal nucleating agent, the lower limit value of the content of the pentaerythritol is preferably 0.05 parts by weight, more preferably 0.1 parts by weight, even more preferably 0.5 parts by weight for 100 parts by weight of the polyester resin (A). If the amount of the pentaerythritol is too large, the resin composition is lowered in viscosity when melted, so that the composition may not be easily worked. Thus, the upper limit value of the content of the pentaerythritol is preferably 12 parts by weight, more preferably 10 parts by weight, even more preferably 8 parts by weight for 100 parts by weight of the polyester resin (A).

The polyester resin composition of the present invention is more excellent than a polyester resin alone or a resin composition containing a polyester resin and a sugar alcohol compound other than pentaerythritol, the crystallization of the composition proceeds stably under broad processing conditions. Thus, the composition has the following advantages.

In poly(3-hydroxybutyrate-co-3-hydroxyhexanoate) (hereinafter may be referred to as P(3HB-co-3HH)), poly (3-hydroxybutyrate-co-3-hydroxyvalerate (P(3HB-co-3HV)) and others out of polyester resins, the proceed of the crystallization is affected by the resin temperature at the melting time when these resins are each cooled to be crystallized after heated and melted. In other words, as the resin temperature is higher at the melting time, it tends to become more difficult that the crystallization proceeds. For example, in P(3HB-co-3HH), the following tendency is produced: when the resin temperature at the melting time is in a range from the melting point of the resin to about 170° C., it becomes more difficult that the crystallization of the resin proceeds at the cooling time as the resin temperature is higher at the melting time. Moreover, when the resin temperature at the melting time is about 180° C. or higher, the crystallization at the cooling time tends to advance over several hours. Accordingly, for better processing, it is required to control the resin temperature at the melting time to a temperature range of about 170 to 180° C. However, in ordinary forming, a resin does not have a uniform temperature while melted; it is therefore very difficult that the resin is controlled to this temperature range.

The crystallization of the polyester resin composition of the present invention proceeds stably in a broad temperature range when the resin is melted. In other words, even when the resin temperature at the melting time is in a temperature range from the melting point of the resin or higher to about 190° C., the crystallization proceeds stably and quickly so that the resin composition of the present invention has excellent working processability for broad processing conditions. It is not preferred from the viewpoint of thermal deterioration to melt the resin composition at such a temperature that the resin temperature at the melting time is 200° C. or higher.

The proceed of the crystallization of polyhydroxyalkanoates also depends on the cooling temperature thereof. For example, P(3HB-co-3HH) has a tendency that the crystallization thereof proceeds most speedily when the cooling temperature after the heating and melting is from 50 to 70° C. When the cooling temperature is lower than 50° C., or is higher than 70° C., the crystallization tends not to proceed easily. In general pellet compounding or forming, the cooling temperature correlates the cooling water tank temperature, and the mold or cooling-roll temperature. Thus, it is required to control the cooling water temperature, and the mold or cooling roll temperature into the above-mentioned temperature range, that is, the range of 50 to 70° C. However, in order to control, for example, the formed temperature when the composition is formed into a uniform value, it is necessary to design the structure or shape of the mold minutely. The design is very difficult.

The crystallization of the polyester resin composition of the present invention proceeds stably in a broad cooling temperature range of the resin after the composition is melted. In other words, even when the cooling temperature after the heating and melting is in a temperature range of 20 to 80° C., the crystallization proceeds stably and speedily; accordingly, the resin composition of the present invention has excellent processing properties for broad processing conditions.

The polyester resin composition of the present invention expresses properties as described below since the crystallization thereof proceeds stably and speedily.

For example, when P(3HB-co-3HH) is formed, the crystallization thereof does not proceeds sufficiently. Even after the forming, the crystallization proceeds gradually so that spherulites grow. Thus, the resultant formed article tends to change with time in mechanical properties to become brittle gradually. However, immediately after the polyester resin composition of the present invention is formed, many fine crystals are produced. Thus, after the forming, spherulites do not grow easily, and the formed article is also restrained from becoming brittle. Consequently, the present invention is excellent in article quality stability.

Out of polyester resins, polyhydroxyalkanoates are slow in crystallization. When any one of the resins is worked into, for example, pellets, it is necessary to make a design to gain a long time for the step of cooling the resin. Unless the line speed when the resin is subjected to T-die film forming is lowered, the resultant film is poor in releasability from the cooling roll, so that the productivity or the shape of the film may be deteriorated. When the resin is subjected to film blowing, the balloons may become instable. Additionally, a gap is present between joining portions (for example, parting line portions, inserting portions or slide-core sliding portions) of a cavity in a shaping-mold for injection molding. When the resin is injection-molded, the resin melted is put into the gap to produce a "burr" and then the burr bonds to the formed article. Since polyhydroxyalkanoates are slow in crystallization to keep a long period when the resins have fluidity, the burr is easily generated to require a large labor for post-treating the formed article. However, the polyester resin composition of the present invention is speedy in crystallization so that this problem is not easily caused.

The polyester resin composition according to the present invention can easily be produced through a known melt-kneading machine as far as the machine is capable of heating raw materials of the composition to the melting point or higher of the polyester resin, and then kneading the raw materials. For example, the following methods are usable: a method of using, for example, an extruder, a roll mill or a Bunbury mixer to melt-knead the polyester resin, the crystallization promoter and pentaerythritol, and optional other components to be made into a pellet form, and then forming and molding the resultant; and a method of preparing a masterbatch containing pentaerythritol at a high concentration beforehand, melt-kneading this masterbatch with a polyhydroxyalkanoate and a graft copolymer at a desired ratio, and forming and molding the resultant. Pentaerythritol, the crystallization promoter and the polyhydroxyalkanoate may be added simultaneously into the kneading machine, or the polyhydroxyalkanoate and the graft copolymer may be melted beforehand and then pentaerythritol may be added thereto.

As far as the advantageous effects of the present invention are not hindered, the polyester resin composition of the present invention may contain various additives. Examples of the additives include a lubricant, a crystal nucleating agent other than pentaerythritol, a plasticizer, a hydrolysis inhibitor, an anti-oxidant, a releasing agent, an ultraviolet absorber, colorants such as a dye and a pigment, and an inorganic filler. One or more of the additives are usable in accordance with the purpose of the resin composition. These additives preferably have biodegradability.

Other examples of the additives include inorganic fibers such as carbon fiber, and organic fibers such as human hair and wool. The other additives may be natural fibers such as bamboo fiber, pulp fiber, kenaf fiber, and a natural fiber of any other similar plat-alternate species, an annual herb plant in Hibiscus genus, Malvaceae family or an annual herb plant in Tiliaceae family. From the viewpoint of carbon dioxide reduction, a plant-originating natural fiber is preferred, and kenaf fiber is particularly preferred.

The following will describe an example of a method for producing a formed article made of the polyester resin composition of the present invention.

First, an extruder, a kneader, a Bunbury mixer or a roll is used to melt-knead the polyester resin, the crystallization promoter, the pentaerythritol, and the various optional additives to produce a polyester resin composition. The composition is extruded into a strand form. The strand is cut to yield pellets each made of the polyester resin composition in the form of particles having, for example, a circularly columnar, elliptically columnar, spherical, cubic or rectangular parallelepiped shape.

In this operation, the temperature for melt-kneading the polyester resin, the crystallization promoter and the others depends on the melting point, the melt-viscosity and other factors of the polyester resin to be used, the melt-viscosity of the graft copolymer, and others. Thus, the temperature cannot be specified without reservation. However, when the polyester resin is, for example, a polyhydroxyalkanoate, the resin temperature of the melt-kneaded product at an outlet in the die is preferably from 140 to 200° C., more preferably from 150 to 195° C., even more preferably from 160 to 190° C. If the resin temperature of the melt-kneaded product is lower than 140° C., the kneading may become insufficient. If the temperature is higher than 200° C., the polyhydroxyalkanoate may be thermally decomposed.

The pellets produced by this method are sufficiently dried at 40 to 80° C. to remove water, and then formed by a known forming method to yield formed article. Examples of the forming method include film forming, sheet forming, injection molding, blow molding, fiber spinning, extrusion foaming, and bead foaming.

Examples of the method for producing a film formed article include T-die extrusion, calendering, roll molding and film blowing. However, the film forming method is not limited to these examples. The forming temperature at the time of the film forming is preferably from 140 to 190° C. A film obtained from the polyester resin composition of the present invention can be subjected to thermal molding under heating, vacuum molding, or compression molding.

The method for producing an injection-molded article may be, for example, an injection molding method generally adopted to mold a thermoplastic resin, such as injection molding, gas assist molding, or injection compression molding. In accordance with the purpose, the following methods other than the above-mentioned methods may be adopted: in-mold molding, gas pressing, two-color molding sandwiching molding, and push-pull molding and SCORIM. However, the injection molding method is not limited to these examples. At the time of the injection molding, the molding temperature is preferably from 140 to 190° C., and the mold temperature is preferably from 20 to 80° C., more preferably from 30 to 70° C.

The formed article of the present invention is favorably usable in the fields of agriculture, fishery, forestry, gardening, medical science, hygiene products, food industry, clothes, non-clothes, packages, automobiles, building material, and others.

EXAMPLES

Hereinafter, the present invention will be specifically described by way of working examples. However, the technical scope of the invention is not limited by these examples.

Production Example 1

For culturing and production, a KNK-005 strain (see the specification of U.S. Pat. No. 7,384,766) was used.

The composition of a mother culture medium was as follows: 1 w/v % Meat-extract, 1 w/v % Bacto-Tryptone, 0.2 w/v % Yeast-extract, 0.9 w/v % $Na_2HPO_4.12H_2O$ and 0.15 w/v % $KH_2PO_4$ (pH: 6.8).

The composition of a preculture medium was as follows: 1.1 w/v % $Na_2HPO_4.12H_2O$, 0.19 w/v % $KH_2PO_4$, 1.29 w/v % $(NH_4)_2SO_4$, 0.1 w/v % $MgSO_4.7H_2O$, a 0.5 v/v % trace mineral salt solution (1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$ and 0.012 w/v % $NiCl_2.6H_2O$ were dissolved in 0.1 N hydrochloric acid). As a carbon source, palm oil was added batchwise at a concentration of 10 g/L.

The composition of a production medium of PHA was as follows: 0.385 w/v % $Na_2HPO_4.12H_2O$, 0.067 w/v % $KH_2PO_4$, 0.291 w/v % $(NH_4)_2SO_4$, 0.1 w/v % $MgSO_4.7H_2O$ and a 0.5 v/v % trace mineral salt solution (1.6 w/v % $FeCl_3.6H_2O$, 1 w/v % $CaCl_2.2H_2O$, 0.02 w/v % $CoCl_2.6H_2O$, 0.016 w/o % $CuSO_4$-$5H_2O$ and 0.012 w/v % $NiCl_2.6H_2O$ were dissolved in 0.1 N hydrochloric acid), and 0.05 w/v % BIOSPUREX 200K (antifoaming agent manufactured by Cognis Japan Ltd.).

First, a glycerol stock (50 μL) of the KNK-005 strain was inoculated into the mother culture medium (10 mL), and cultured for 24 hours to perform mother culture. Next, the mother culture liquid was inoculated at 1.0 v/v % into a 3-L jar fermenter (MDL-300 model, manufactured by B. E. Marubishi Co., Ltd.) in which 1.8 L of the preculture medium was put. The operating conditions involved a culture temperature of 33° C., a stirring rate of 500 rpm, and an aeration rate of 1.8 L/min. While the pH was controlled to the range of 6.7 to 6.8, the preculture was performed by culturing for 28 hours. For the pH control, a 14% aqueous ammonium hydroxide solution was used.

Next, the preculture liquid was inoculated at 1.0 v/v % into a 10-L jar fermenter (MDS-1000 model, manufactured by B. E. Marubishi Co., Ltd.) in which 6 L of the production medium was put. The operating conditions involved a culture temperature of 28° C., a stirring rate of 400 rpm, and an aeration rate of 6.0 L/min, with the pH controlled to range of 6.7 to 6.8. For the pH control, a 14% aqueous ammonium hydroxide solution was used. As a carbon source, palm oil was used. The culture was performed for 64 hours, and after completing the culture, the bacterial cells were recovered by centrifugal separation, washed with methanol, freeze-dried and then the weight of dry bacterial cells was measured To 1 g of the resultant dried bacterial cells was added 100 mL of chloroform, and the resultant was stirred at room temperature overnight to extract PHA in the bacterial cells. The residue of the bacterial cells was filtered off, and then the extract was concentrated to give the total volume of 30 ml with an evaporator. Thereto was gradually added 90 mL of hexane. The resultant was then allowed to stand still for 1 hour while slowly stirred. The precipitated PHA was filtered off, and then vacuum-dried at 50° C. for 3 hours to yield PHA. The 3HH composition analysis of the resultant PHA was made through gas chromatography as follows: To 20 mg of the dried PHA were added 2 mL of a mixed liquid of sulfuric acid and methanol (15/85) and 2 mL of chloroform. The system was airtightly stopped, and heated at 100° C. for 140 minutes to yield a methyl ester of a decomposition product of the PHA. After cooling, 1.5 g of sodium hydrogencarbonate was added thereto little by little to neutralize the mixture, and left to stand still until the generation of carbon dioxide gas stopped. Thereto was added 4 mL of diisopropyl ether, and the components were sufficiently mixed with each other and then centrifuged. The monomer unit composition of the polyester decomposition product in the supernatant was analyzed through capillary gas chromatography. A gas chromatograph used for the above was GC-17A manufactured by Shimadzu Corporation. A capillary column used therefor was NEUTRA BOND-1 manufactured by GL Sciences Inc. (column length: 25 m, column internal diameter: 0.25 mm, and liquid film thickness: 0.4 µm). As a carrier gas, He was used. The pressure in an inlet of the column was set to 100 kPa, and the amount of an injected sample was 1 L. Regarding temperature conditions, the sample temperature was raised from an initially starting temperature of 100° C. to 200° C. at a rate of 8° C./minute, and further raised from 200 to 290° C. at a rate of 30° C./minute As a result of the analysis under these conditions, the resultant compound was PHA as represented by the formula (1), poly(3-hydroxybutyrate-co-3-hydroxyhexanoate) (P(3HB-co-3HH)). The weight average molecular weight Mw, which was measured by the GPC, was 600000. The 3-hydroxyhexanoate (3HH) composition was 5.6 mol %.

Production Example 2

The same manner as used in Production Example 1 was performed except that a KNK-631 strain (see WO 2009/145164) was used instead of the KNK-005 strain to produce a polyhydroxyalkanoate raw material A2, P(3HB-co-3HH). The weight average molecular weight Mw was 620000. The 3HH composition was 7.8 mol %.

Production Example 3

The same manner as used in Production Example 1 was performed except that a KNK-631 strain, and palm kernel oil as a carbon source were used to produce a polyhydroxyalkanoate material A3, P(3HB-co-3HH). The weight average molecular weight Mw was 650000. The 3HH composition was 11.4 mol %.

Examples 1 to 7

(Production of Polyester Resin Compositions)

In each of the examples, a biaxial extruder of an identical-direction engaging type (TEX 30 manufactured by the Japan Steel Works, Ltd.) was used to make a composition having a blend ratio shown in Table 1 into pellets of a polyester resin composition. The pellet productivity was evaluated.

As the polyhydroxyalkanoate raw materials A1, A2 and A3, the resins yielded in Production Examples 1, 2 and 3 were used, respectively.

As a polyhydroxyalkanoate raw material A4, the following was used: poly(3-hydroxybutyrate-co-3-hydroxyvalerate) (3-hydroxyvalerate (3HV) proportion: 5.0 mol %) manufactured by Sigma-Aldrich Corporation. The weight average molecular weight Mw was 650000.

As crystallization promoter raw materials B1 and B2, the following were used, respectively: glycerin diacetomonolaurate ("RIKEMAL (registered trademark)" PL012, manufactured by Riken Vitamin Co., Ltd.); and glycerin diacetomonoester: $(CH_3CO)$—O—CH—CH—O—$(COCH_3)$ $CH_2$—O—$(COCH_nH_{2n+1})$ ("RIKEMAL (registered trademark)" PLO 19, manufactured by Riken Vitamin Co., Ltd.).

As a pentaerythritol raw material C1, pentaerythritol ("PENTARIT T (registered trademark)" manufactured by Koei-Perstorp Co., Ltd.) was used.

Pellet Productivity:

The pellet productivity was evaluated in the following manner. In the state that the setting temperature of the extruder is from 120 to 140° C., the screw rotating speed was gradually raised from 100 rpm to increase the discharge amount. A strand-form melted resin extruded out through the die of the extruder is passed through a hot-bath filled with water having a temperature set to 60° C. and having a length of 1.5 m to be crystallized and solidified. The solid is cut into a pellet form with a pelletizer. In order to heighten the pellet productivity by increasing the discharge amount of the resin, the screw rotating speed of the extruder and the line speed need to be raised. When the screw rotating speed is raised, the resin temperature is heightened by shearing heat generation. Furthermore, as the line speed is raised, the residential time in the hot-bath becomes shorter. When the temperature of the resin is higher, the crystallization thereof becomes more difficult. Moreover, when the residential time in the hot-bath tank at 60° C. becomes short, the resin is not sufficiently crystallized so that the resin is kept soft as it is. In other words, when the resin temperature is raised so that the residential time in the hot-bath becomes short, the resin composition cannot be cut with the pelletizer. The maximum strand line speed at which the pelletization can be attained was defined as the pellet productivity. It means that as the line speed value is higher, the pellet productivity is better. When the line speed was raised, the screw rotating speed of the extruder was also raised to adjust the strand diameter (the average of the long diameter and the short diameter) to 3±0.2 mm. The resin temperature was measured by bring the melted resin extruded out through the die of the extruder into direct contact with a K-type thermocouple. The results are shown in Table 1.

Comparative Examples 1 to 8

The pellet productivity of their polyester resin composition was evaluated in the same manner as in Examples 1 to 7. The results are shown in Table 1.

TABLE 1

| | | Composition | | Example | | | | | | | Comparative Example | |
|---|---|---|---|---|---|---|---|---|---|---|---|---|
| | | | | 1 | 2 | 3 | 4 | 5 | 6 | 7 | 1 | 2 |
| Raw matetials | Polyhydroxyalkanoate | Raw material A1 | 3HH:: 5.6 mol % | 100 | | | | | | | 100 | |
| | Polyhydroxyalkanoate | Raw material A2 | 3HH:: 7.8 mol % | | 100 | | | | | | | 100 |
| | Polyhydroxyalkanoate | Raw material A3 | 3HH:: 11.4 mol % | | | 100 | 100 | 100 | | 100 | | |
| | Polyhydroxyalkanoate | Raw material A4 | 3HV:: 5.0 mol % | | | | | | 100 | | | |
| | Crystallization promoter | Raw material B1 | | 5 | 10 | 10 | 10 | 20 | 5 | | — | — |
| | | Raw material B2 | | | | | | | | 10 | | |
| | Pentaerythritol | Raw material C1 | | 1 | 1 | 1 | 5 | 1 | 1 | 1 | 1 | 1 |
| Pellet productivity | Resin temperature (° C.) | | | 165 | 160 | 157 | 157 | 157 | 158 | 156 | 163 | 159 |
| | Maximum strand line speed (m/min) | | | 26 | 21 | 14 | 23.4 | 15 | 23.4 | 14 | 20 | 15 |

| | | Composition | | Comparative Example | | | | | |
|---|---|---|---|---|---|---|---|---|---|
| | | | | 3 | 4 | 5 | 6 | 7 | 8 |
| Raw matetials | Polyhydroxyalkanoate | Raw material A1 | 3HH:: 5.6 mol % | | | | 100 | | |
| | Polyhydroxyalkanoate | Raw material A2 | 3HH:: 7.8 mol % | | | | | 100 | |
| | Polyhydroxyalkanoate | Raw material A3 | 3HH:: 11.4 mol % | 100 | 100 | | | | 100 |
| | Polyhydroxyalkanoate | Raw material A4 | 3HV:: 5.0 mol % | | | 100 | | | |
| | Crystallization promoter | Raw material B1 | | — | — | — | 5 | 10 | 10 |
| | | Raw material B2 | | | | | | | |
| | Pentaerythritol | Raw material C1 | | 1 | 5 | 1 | — | — | — |
| Pellet productivity | Resin temperature (° C.) | | | 155 | 156 | 162 | 162 | 158 | 154 |
| | Maximum strand line speed (m/min) | | | 10 | 18 | 21 | 16 | 12 | 10 |

As is evident from Table 1, it was understood that the use of a crystallization promoter together makes it possible to heighten the line speed of a strand, and the composition is excellent in pellet productivity.

Examples 8 to 13

(Production of Polyester Resin Compositions)

In each of these examples, a biaxial extruder of an identical-direction engaging type (TEX 30 manufactured by the Japan Steel Works, Ltd.) was used to melt-knead components at a set temperature of 120 to 140° C. and a screw rotating speed of 100 rpm to yield a polyester resin composition. The polyester resin composition was pulled out into a strand form through the dice. The strand was cut into a pellet form.

(Sheet Productivity by T-Die Forming)

The sheet productivity was evaluated in the following manner. A T-die sheet forming machine (Laboplast mill, manufactured by Toyo Seiki Seisaku-Sho, Ltd.) was used to make the resultant pellets as a raw material into a sheet having a width of 100 mm at a die thickness of 250 μm, a die-slip width of 150 mm, a cylinder set temperature of 120 to 140° C., a die set temperature of 140 to 150° C., and a cooling roll set temperature of 60° C. The melted resin pushed out through the T-die into the sheet form contacts the cooling roll to be crystallized. In this way, a sheet having a thickness of 100 μm is formed. When the resin is sufficiently crystallized, the formed sheet is released from the cooling roll, and then wound. However, when the sheet line speed is raised, the period when the sheet contacts the cooling roll becomes short so that the sheet is not sufficiently solidified without being crystallized. Thus, the sheet cannot be released from the roll. The maximum sheet line speed at which the sheet can be released was defined as the sheet productivity. It means that as the line speed value is higher, the sheet productivity is better. The resin temperature was measured by bringing the melted resin pushed out through the T-die into direct contact with a K-type thermocouple.

Comparative Examples 9 to 16

The sheet productivity of their polyester resin composition was evaluated in the same manner as in Examples 8 to 13. The results are shown in Table 2.

TABLE 2

|  |  |  | Composition | Example 8 | Example 9 | Example 10 | Example 11 | Example 12 | Example 13 | Comparative Example 9 | Comparative Example 10 |
|---|---|---|---|---|---|---|---|---|---|---|---|
| Raw materials | Polyhydroxyalkanoate | Raw material A1 | 3HH:: 5.6 mol % | 100 |  |  |  |  |  | 100 |  |
|  |  | Raw material A2 | 3HH:: 7.8 mol % |  | 100 |  |  |  |  |  | 100 |
|  |  | Raw material A3 | 3HH:: 11.4 mol % |  |  | 100 | 100 | 100 |  |  |  |
|  |  | Raw material A4 | 3HV:: 5.0 mol % |  |  |  |  |  | 100 |  |  |
|  | Crystallization promoter | Raw material B1 |  | 5 | 10 | 10 | 10 | 20 | 5 | — | — |
|  | Pentaerythritol | Raw material C1 |  | 1 | 1 | 1 | 5 | 1 | 1 | 1 | 1 |
| Sheet productivity by T-die forming | Resin temperature (° C.) |  |  | 166 | 165 | 161 | 162 | 162 | 165 | 165 | 164 |
|  | Maximum sheet line speed (m/min) |  |  | 16 | 13 | 7 | 11 | 8 | 17 | 14 | 10 |

|  |  |  | Composition | Comparative Example 11 | Comparative Example 12 | Comparative Example 13 | Comparative Example 14 | Comparative Example 15 | Comparative Example 16 |
|---|---|---|---|---|---|---|---|---|---|
| Raw materials | Polyhydroxyalkanoate | Raw material A1 | 3HH:: 5.6 mol % |  |  |  | 100 |  |  |
|  |  | Raw material A2 | 3HH:: 7.8 mol % |  |  |  |  | 100 |  |
|  |  | Raw material A3 | 3HH:: 11.4 mol % | 100 | 100 |  |  |  | 100 |
|  |  | Raw material A4 | 3HV:: 5.0 mol % |  |  | 100 |  |  |  |
|  | Crystallization promoter | Raw material B1 |  | — | — | — | 5 | 10 | 10 |
|  | Pentaerythritol | Raw material C1 |  | 1 | 5 | 1 | — | — | — |
| Sheet productivity by T-die forming | Resin temperature (° C.) |  |  | 160 | 161 | 164 | 164 | 163 | 159 |
|  | Maximum sheet line speed (m/min) |  |  | 5 | 9 | 15 | 6 | 5 | 3 |

As is evident from Table 2, it was understood that the use of a crystallization promoter together makes it possible to heighten the sheet line speed, and the composition is excellent in sheet producing performance.

The invention claimed is:

1. A polyester resin composition, comprising:
   a polyester resin (A) comprising at least one selected from the group consisting of poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate);
   a crystallization promoter (B) comprising a glycerin diacetomonoester; and
   a crystal nucleating agent comprising pentaerythritol (C),
   wherein a molar ratio of 3-hydroxybutyrate to a comonomer in the polyester resin (A) is from 97/3 to 80/20,
   the crystallization promoter (B) is included in an amount of 4 to 20 parts by weight for 100 parts by weight of the polyester resin (A), and
   the pentaerythritol (C) is included in an amount of 0.5 to 8 parts by weight for 100 parts by weight of the polyester resin (A).

2. The polyester resin composition according to claim 1, wherein the glycerin diacetomonoester comprises at least one selected from the group consisting of glycerin diacetomonolaurate, glycerin diacetomonooleate, glycerin diacetomonostearate, glycerin diacetomonocaprylate, and glycerin diacetomonodecanoate.

3. The polyester resin composition according to claim 1, wherein the polyester resin (A) further comprises at least one selected from the group consisting of polyethylenesuccinate, polybutylenesuccinate, and polybutylenesuccinate/adipate.

4. A polyester resin formed article obtained by forming the polyester resin composition according to claim 1.

5. The polyester resin composition according to claim 2, wherein the polyester resin (A) further comprises at least one selected from the group consisting of polyethylenesuccinate, polybutylenesuccinate, and polybutylenesuccinate/adipate.

6. The polyester resin composition according to claim 1, wherein the crystallization promoter (B) is glycerin diacetomonolaurate.

7. The polyester resin composition according to claim 3, wherein the crystallization promoter (B) is glycerin diacetomonolaurate.

8. The polyester resin composition according to claim 1, wherein the pentaerythritol (C) is included in an amount of 1 to 5 parts by weight for 100 parts by weight of the polyester resin (A).

9. The polyester resin composition according to claim 2, wherein the pentaerythritol (C) is included in an amount of 1 to 5 parts by weight for 100 parts by weight of the polyester resin (A).

10. The polyester resin composition according to claim 1, wherein the molar ratio of 3-hydroxybutyrate to a comonomer in the polyester resin (A) is from 95/5 to 85/15.

11. The polyester resin composition according to claim 2, wherein the molar ratio of 3-hydroxybutyrate to a comonomer in the polyester resin (A) is from 95/5 to 85/15.

12. A polyester resin formed article obtained by forming the polyester resin composition according to claim 2.

13. A polyester resin formed article obtained by forming the polyester resin composition according to claim 3.

14. The polyester resin composition according to claim 1, wherein the polyester resin (A) comprises poly(3-hydroxybutyrate-co-3-hydroxyvalerate).

15. The polyester resin composition according to claim 1, wherein the polyester resin (A) comprises poly(3-hydroxybutyrate-co-3-hydroxyvalerate-co-3-hydroxyhexanoate).

16. The polyester resin composition according to claim 1, wherein the polyester resin (A) comprises poly(3-hydroxybutyrate-co-3-hydroxyhexanoate).

17. The polyester resin composition according to claim 1, wherein the polyester resin (A) comprises poly(3-hydroxybutyrate-co-4-hydroxybutyrate).

18. The polyester resin composition according to claim 1, wherein the polyester resin (A) comprises at least one of poly(3-hydroxybutyrate-co-3-hydroxyvalerate) and poly(3-hydroxybutyrate-co-3-hydroxyhexanoate).

19. The polyester resin composition according to claim 2, wherein the polyester resin (A) comprises at least one of poly(3-hydroxybutyrate-co-3-hydroxyvalerate) and poly(3-hydroxybutyrate-co-3-hydroxyhexanoate).

20. The polyester resin composition according to claim 1, further comprising:
 an additive selected from the group consisting of a lubricant, a crystal nucleating agent other than pentaerythritol, a plasticizer, a hydrolysis inhibitor, an anti-oxidant, a releasing agent, an ultraviolet absorber, a colorant, an inorganic filler, and a combination thereof.

* * * * *